Nov. 28, 1939.   H. G. LANDIS   2,181,138

GAS HEATING APPARATUS

Filed July 19, 1938

INVENTOR.
Hugh G. Landis,
BY
ATTORNEY.

Patented Nov. 28, 1939

2,181,138

UNITED STATES PATENT OFFICE 2,181,138

GAS HEATING APPARATUS

Hugh G. Landis, Los Angeles, Calif., assignor to Bess S. Landis

Application July 19, 1938, Serial No. 219,997

14 Claims. (Cl. 126—85)

My invention relates generally to gas heating apparatus, and more particularly to that branch of the art wherein a radiant body or mantle is disposed above a burner to convert the heat given up by the burner flame into radiant heat. This application is a continuation in part of my former application Serial No. 22,903, filed May 22, 1935.

I am aware of the fact that many kinds of mantles and radiant heaters have been offered to the art, but so far as known to me they have all been singularly deficient in giving satisfactory heating efficiency without the formation of carbon monoxide. It is the major object of my invention to provide a heater employing a radiant mantle which will give an unusually high percentage of radiant heat and a phenomenally low percentage of carbon monoxide.

It is also an object of my invention to provide a gas heater of the radiant type in which the mantle is formed and disposed in such a manner as to direct the greater portion of the radiant heat into the useful zone for heating purposes.

It is a further object of my invention to provide a radiant mantle which can be used with various types of burners, and heating installations which will promote an extremely high efficiency therefor.

It is another object of my invention to provide a heater which is simple and durable in its construction and which when embodied in a portable type heater is unusually safe.

A further object of my invention is to provide a combination heater and air moving device which further promotes the flow of heat therefrom into the useful zones for domestic and other heating purposes.

Still another object of my invention is to provide an efficient mantle type heating device which lends itself to use in house heaters, boilers, furnaces, cooking ranges, etc., where a high percentage of radiant heat is desired.

Figure 1:
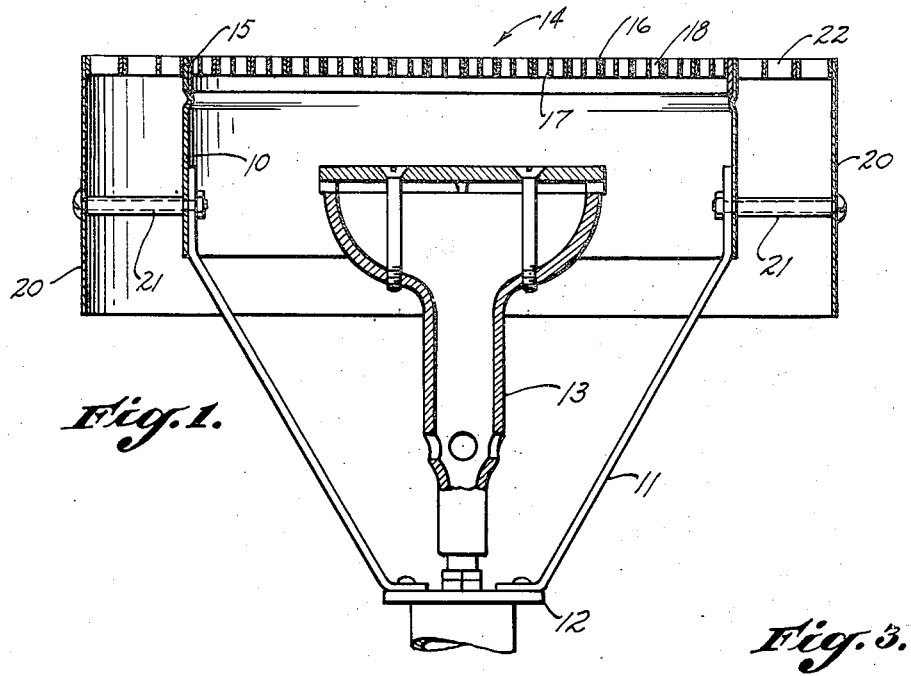
Figures 2, 3:
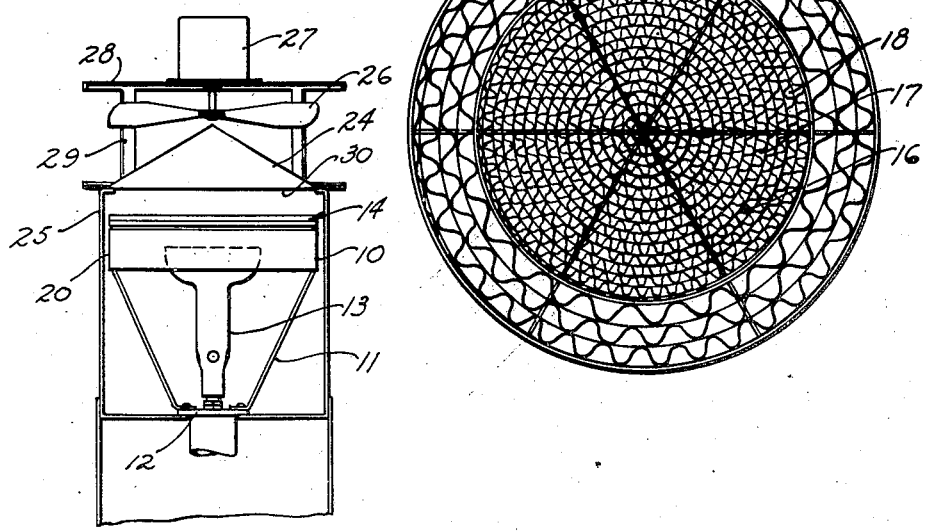

These and other objects and advantages of my invention will become apparent from the following description of a preferred form thereof, and from an inspection of the accompanying drawing in which:

Fig. 1 is a vertical cross-section of a heater made in accordance with my invention, Fig. 2 is an elevational view of said heater combined with apparatus for directing the flow of heat therefrom, and Fig. 3 is a plan view of the heater of Fig. 1 showing the mantle in detail.

Referring now to the drawing, and particularly to Fig. 1 thereof, the numeral 10 indicates a vertically disposed housing or shell which is preferably cylindrical in form and is open at both its upper and lower ends.

The housing may be supported in any suitable manner, as by a plurality of braces 11 which extend diagonally down to a plate 12 supported at the base of a burner 13 which is vertically disposed within the shell 10. The burner 13 may be of any suitable type adapted to give as nearly perfect combustion as possible, and preferably has a circular head with accurately machined ports around its periphery. Burners of the Bunsen burner type have proved admirably suited for use in my heating apparatus.

Overlying the burner 13 in a substantially horizontal position, and preferably supported by the upper edge of shell 10 is a radiant mantle indicated generally by the numeral 14. The space between the upper face of the burner 13 and the lower face of the mantle 14 is such that the upper end of the visible flame from the burer will not quite impinge upon the mantle 14, i. e., the mantle is disposed just above the normal upper limit of the flame of the burner. The exact distance between the burner and the mantle will of course depend upon the size of the flame and the completeness of the combustion therein, but for a burner of the type illustrated, operating with the normal gas pressure furnished in most cities, I have found that if the mantle is spaced approximately 1¼ inches above the upper face of the burner it will be just above the normal upper limit of the flame and will consequently develop its highest efficiency.

As seen best in Fig. 3, mantle 14 is formed of an outer circular plate or ring 15 within which a pair of metallic ribbons 16 and 17 are spirally wound in alternation with each other, the ribbon 16 being flat and the ribbon 17 being crimped or corrugated, and disposed with its return bends in vertical contact with adjacent convolutions of the flat ribbon 16. By this construction, the mantle is formed with a multiplicity of small vertically-disposed closely-related cells 18 whose depth is equal to the width of the ribbons and whose cross-section depends upon the space between adjacent convolutions of the ribbons which in turn depends upon the size of the corrugations in ribbon 17. In practice, the two ribbons are spirally wound from the center outwardly until they form a mantle of the required size, at which time their ends are fastened and they are secured within the outer ring 15. Suitable bracing means such as the spider 19 is provided and fastened as by welding to the inside of the ring 15 and to the under side of the ribbons. It will be noted that the ring 15 is preferably of sufficient width, so that the upper face of the ribbons 16 and 17 will be flush with the upper edge of the ring, and the lower edge of the spider will be flush with the lower edge of the ring. By this construction a very rugged and easily handled mantle is provided, it also being seen that the size of the mantle can be easily varied by merely varying the number of convolutions of ribbon and the size of the ring 15.

The ribbons used in the mantle should of course be made of metal having a high radiation characteristic, and I have found that chrome steel having around 27% chromium content gives most excellent results. It is advisable of course to have the ribbon as thin as possible consistent with the requisite strength and rigidity and I have found that ribbons of about .0071 inch in thickness meet these conditions very well. For the average domestic heater, optimum performance is had when a ⅛ inch ribbon is used to form the cells and the corrugations are adjusted so that there will be approximately 130 cells to the square inch, under which conditions the ratio of cell depth to the average cell width is just a trifle over 1 to 1. However, as will be discussed more in detail hereinafter, other ribbon and cell sizes may be used within certain limits.

In the form of my heater illustrated in Figs. 1 and 3, I have shown an outer cylindrical shell 20 concentrically mounted outside of shell 10 by any suitable means, such as bolts 21 extending through the lower portion of the shell 10 and through the upper portion of braces 11. The upper end of the annular space between the two shells is preferably provided with a grill work 22 which may be formed by spirally winding a flat and a corrugated ribbon in adjacent convolutions in the manner previously described for the mantle 14. However, openings in the grill 22 are preferably much larger than those of the mantle 14, for instance, approximately three or four times as large.

I have found that by providing the grill work 22 between the concentric shells 10 and 20, convection currents are promoted in the annular space between the cylinders, so that an effective updraft of air will be formed entirely around the inner cylinder. This upflow of air assists in keeping the shell 20 at a comparatively low temperature, and the convection currents are moved at a sufficiently rapid rate to keep the temperature of the grill work 22 much lower than that of the mantle 14. Consequently, a protecting shell is provided around the heater proper, so that a person coming in contact therewith will not be seriously burned as would be the case upon coming in contact with the inner cylinder 10 or the mantle 14. While merely providing the two concentric cylinders will cause a certain convection of air therethrough, I have found that the addition of the grill work 22 at the upper end of the chamber between the cylinders promotes the convection currents therein and thus increases the cooling and protecting qualities of the annular cooling chamber.

As is well-known in the art, radiant heat is much more efficient in warming a room than is convection heat, and as also known, the amount of heat radiated by a given body depends upon its temperature, molecular structure and the area of the radiating surface. Furthermore, it is desirable that the radiant heat be directed into the useful zone, in order to get the highest possible efficiency, this being particularly true for domestic heating such as required in heating the rooms of a house or other structure. By using the metal construction hereinbefore described, it is possible to incorporate an unusually large amount of radiating surface within a small area, for as will be seen from the drawing, the very thin ribbons wound in close proximity to each other provide a multitude of small cells each of which has a large radiating surface. By disposing the mantle in a substantially horizontal position, a substantial portion of each of the vertical walls of each cell will radiate heat directly into the adjacent atmosphere, the majority of the heat being radiated out at an angle between the horizontal and the vertical, with the maximum being on the line nearest the horizontal which just clears the adjoining cell wall.

In any heating device, there are always two major requirements which must be met in order to have a satisfactory commercial product; first, the heater must produce almost perfect combustion which means that a minimum of carbon monoxide is formed; and secondly, the heating efficiency must be relatively high with preferably a high ratio of radiant heat to convection heat. In this connection, I have found that there are very definite limitations upon the size and proportions of the cells in the mantle of my invention, and that unless the proportions of the cellular structure are kept within these limits, the heater is totally unfit for practical service.

As the result of exhaustive tests, I have found that if the mantle has more than 200 cells per square inch, combustion is inhibited, and an excessive amount of carbon monoxide is formed, rendering the heater unfit for use in human habitations; and this maximum allowable figure holds for ribbon widths as low as 1/16 of an inch, it being obvious of course that if less than 1/16 inch ribbon is used, the effective radiant properties of the mantle so far as providing a good heater are concerned are substantially lost. Beyond this upper limit of 200 cells per square inch, the free upflow of the products of combustion of the burner 13 is so inhibited that the hot gases instead of passing through the cells are in a large measure deflected out around the outer edges of the mantle, and of course do not therefore contribute any heat to speak of to the cellular structure. For instance, if a mantle is used having 400 or 500 cells per square inch, it will be found that it ceases to function as a mantle and acts almost entirely as a deflector plate, giving but little radiant heat and forming much carbon monoxide.

Likewise, I have found that there is a maximum cell depth beyond which it is impossible to go and still have a usable heater. As will be evident, if the cross-section of the cell is maintained constant, and the cell depth is increased, there is a considerable increase in total radiating surface in a given sized mantle, but the additional radiating surface is not within the effective zone of radiation, i. e., in a deep cell most of the heat is radiated back and forth between the cell walls and lost by absorption or in promoting convection currents before it is finally radiated out above or below the mantle. Furthermore, if too much metal is employed in the mantle, an excessive amount of heat is absorbed thereby, and of course is not available for radiation, and if the cells are too deep, it will be found that only the lower portion thereof will be heated to a bright red heat, which means that the hot gases will be impinging upon relatively cold metal before they are discharged from the mantle. In this connection, it will be found that if the mantle is made in accordance with the disclosure herein and is used with a conventional burner of high efficiency, that substantially the entire mantle will be heated to a brilliant red, which indicates high radiant efficiency.

On the other hand, it is essential that the number of cells per square inch be not less than 100, since when the cell cross-section becomes too large, there is a too high percentage of convection heat and a consequent reduction in radiant heat. Furthermore, an increase in the cell cross-section when the depth of the cell is held constant results in a decrease in total radiating surface and although the remaining surface may possibly be heated to a somewhat higher temperature, there is a net decrease in total radiant heat produced. Furthermore, I have found that when the number of cells is decreased to less than 100 cells per square inch, there is an increase in monoxide formed, due probably to the cooling effect of the increased convection currents flowing up through the metal.

In connection with the cell depth, I have found that the cells cannot be more than twice as deep as they are wide, although this ratio varies with the cell depth. For example, if a $\frac{1}{16}$ inch ribbon is used, the optimum ratio by the monoxide test is about 3 to 2, whereas when a $\frac{1}{16}$ ribbon is used, the optimum ratio by the same test is about 3 to 4. In other words, I have found that for a $\frac{1}{16}$ inch ribbon the ideal cell size is approximately 150 cells per square inch, whereas with a $\frac{1}{16}$ inch ribbon, the ideal cell size is approximately 120 cells per square inch, while for a $\frac{1}{8}$ inch ribbon, which is my preferred form, the ideal structure has approximately 130 cells to the square inch. In this connection I have found that when using my preferred form of mantle having approximately 130 cells per square inch with a $\frac{1}{8}$ inch cell depth, I secure about 90% radiant heat and only 10% convection heat. Furthermore, while the radiant heat emitted by a square inch of the red hot portion of the mantle is substantially the same in all of these cases, where ribbons above or below $\frac{1}{8}$ inch width are used, the entire mantle is not heated to a red glow. For instance, taking the optimum cell size from a monoxide standpoint for the $\frac{1}{16}$ inch ribbon, I find that in a 5 inch mantle, the diameter of the glow is only about 4¼ inches, and with a $\frac{1}{16}$ inch ribbon mantle with its optimum cell size that the diameter of the red glow is approximately 4½ inches, whereas with a $\frac{1}{8}$ inch ribbon mantle having optimum cell size for monoxide, the entire mantle is heated to a brilliant red, indicating that maximum heating efficiency is being obtained. Consequently, it appears that there is a definite limit to the cell depth, not only as regards the monoxide formed, but also in connection with the heating efficiency in the mantle, and if a ribbon greater than ¼ inch is used, under ordinary conditions the mantle will be unsatisfactory for heating purposes, both from the monoxide production standpoint, and its heating efficiency.

I am aware of the fact that heretofore burner plates for boilers have been constructed by a process similar to the one I employ in constructing the mantle herein described, but so far as I am aware none of these burner plates are constructed in such a manner as to make them suitable for use as a mantle in a radiant heater, since in order to produce a satisfactory burner plate, it is essential that the cellular passages be long and narrow, i. e., that the ratio of cell depth to cell width be extremely high. For instance, in the patent to Stine, No. 1,372,724, issued in 1921 a burner plate is disclosed in which the ratio of cell depth to cell width is approximately 6 to 1, which ratio would probably have to be increased in view of the teachings in the patent to Burns et al., No. 1,896,286 in which is shown a burner plate having cells which are a maximum of 1/700 of an inch in cross-section, and whose depth is preferably 20 times that of their width. It is to be understood that I do not in any way lay claim to burner plates such as shown by Stine and Burns, since such structures cannot possibly be used as radiant mantles.

Referring now to Fig. 2, in which I have illustrated the radiant device of my invention combined with air moving means, the numeral 10 again indicates a shell of preferably cylindrical shape, forming a combustion chamber in which a burner 13 is disposed, the shell being supported by any suitable means such as diagonal braces 11. A mantle 14 constructed as hereinbefore described is mounted in the upper rim of the shell 10 in a substantially horizontal position with its lower face just above the normal upper limits of the visible flame of the burner 13, it being borne in mind that the mantle of my invention will not function properly if it is placed so close to the upper face of the burner as to allow the flame to play across the mantle, since this results in the formation of carbon monoxide in relatively large quantities in accordance with known laws.

Disposed immediately above the burner 13 is pyramid or cone 24 with its base substantially parallel to the mantle 14 and supported thereabove by any convenient means such as the framework 25. Disposed above the apex of the cone 24 and closely adjacent thereto is an electric fan indicated by the numeral 26 having a motor 27 supported on a horizontal platform 28 which is connected by suitable legs 29 to the cone 24 or to the framework 25 supporting it. The cone 24 is preferably constructed of metal with its base polished so as to provide a good reflecting surface. While the cone may be made of solid metal, I prefer to construct it of sheet metal and to fill the inside with some material having a low heat absorbing factor, such as asbestos or the like, so that there will be a minimum of heat lost by absorption through the base 30 of the cone.

By this construction I obtain all of the advantages of the radiant heater illustrated in Figs. 1 and 3, in combination with means for moving the air down through the area of maximum radiation, to further direct the heat rays into the useful zone. For instance, when a combination heater of this type is mounted on a standard and placed in a room to be heated, the fan 26 will force a strong current of hot air down to the floor, so that the people in the room will have the full benefit of practically all of the heat generated by the heater, the cone 24 being spaced sufficiently above the mantle 14 so that the bulk of the radiant energy is directed outwardly at an angle between the cone and the mantle, and directly into the air stream flowing down over the sides of the cone. I have also found that combination heaters of this type work admirably when suspended by suitable means from the ceiling or rafters in large warehouses or similar buildings where it is desired to have the heaters out of the way and to secure as uniform temperature throughout the room as possible. For example, I have found that two or three heaters thus suspended from the rafters of a large warehouse, will, with a minimum consumption of gas, give a uniform temperature throughout the entire room with a minimum of convection currents, which condition is indispensable in certain industries, such as wineries and the like.

It will be understood of course that the adaptations of my invention illustrated herein are merely representative of the types of installation which are possible with the mantle construction herein disclosed. For example, a plurality of mantles can be grouped in a cluster within one shell or housing if desired, or may be combined with an air-cooling device as shown in Fig. 2, the cone 24 being enlarged and the plurality of mantles spaced side by side beneath the cone so as to give a greater quantity of heat. For example, I have found that a heater of remarkably high efficiency and heat output is produced when 3 separate burners and mantles are spaced 120° apart beneath a single cone and fan in the type of installation shown in Fig. 2.

While I do not of course wish to be limited to a mantle which is disposed in exactly horizontal position, it is to be understood that if the mantle is rotated very far from the horizontal, its heating efficiency is cut down materially since the cell walls are no longer vertical, and consequently cannot uniformly direct their radiant energy into the effective zone to be heated. Furthermore, if the mantle is not kept substantially horizontal, great difficulty is experienced in correlating it with the burner, since to get maximum heating efficiency and as nearly perfect combustion as possible, it is essential that the mantle be spaced uniformly from the flame across its entire area.

It will also be understood of course that I do not wish to limit myself to a round mantle, but that my invention may also be employed with square, oval, rectangular, or other shaped mantles, so long as the cell structure thereof is made in accordance with the limitations hereinbefore set forth. If the shape of the mantle is varied much from circular, it is of course advisable to vary the shape of the burner, so that there will be as nearly as possible an equal distribution of heat onto the lower face of the mantle.

These and other modifications of my invention will become apparent to those skilled in the art, and it is to be understood that the forms of my invention herein depicted are merely illustrative of the principles involved, and that my invention is not to be limited thereby, but is to be accorded the full scope of the appended claims.

I claim as my invention:

1. A radiant type heater which includes: an open flame burner; a mantle overlying said burner; comprising a cellular plate formed of a plurality of thin metallic ribbons spirally wound together to form a series of openings between adjacent convolutions of said ribbons; and means for supporting said mantle just above the normal upper limit of the flame issuing from said burner.

2. A radiant type heater which includes: an open flame burner; a mantle comprising a plurality of thin metallic ribbons spirally wound together, one of said ribbons being transversely corrugated to form a plurality of cellular openings between adjacent convolutions of said ribbons; and means for supporting said mantle just above the normal upper limit of the flame issuing from said burner.

3. A radiant type heater as defined in claim 3, in which the number of cellular openings in said mantle is not less than 100, or more than 200 per square inch.

4. A radiant type heater as defined in claim 3, in which the cellular openings in said mantle are not less than 1/16" deep and not more than 1/4" in depth.

5. A radiant type heater as defined in claim 3, in which the average width of the cellular openings in said mantle is not less than one half the depth thereof.

6. A radiant type heater as defined in claim 3, in which said mantle and said burner are substantially inclosed in a vertical housing open at both ends and defining a combustion-chamber below said mantle.

7. A radiant type heater as defined in claim 3, in which said mantle and said burner are substantially inclosed in a vertical tubular housing open at both ends and a second tubular housing is concentrically supported about said first housing to form an air space therebetween to insulate the same.

8. A radiant type heater which includes: a vertical shell open at each end; an open flame burner disposed within said shell; a mantle supported in the upper portion of said cylinder just above the normal upper limit of the flame from said burner, said mantle comprising an outer ring and a plurality of thin metallic ribbons spirally wound together, one ribbon being transversely corrugated to form a plurality of cellular openings between adjacent convolutions of said ribbons, said cellular openings being approximately 1/8" in depth and there being between 100 and 200 of said openings in each square inch of said mantle.

9. A radiant type heater which includes: a vertical shell open at each end; an open flame burner disposed within said shell; a mantle supported in the upper portion of said cylinder just above the normal upper limit of the flame from said burner, said mantle comprising an outer ring and a plurality of thin metallic ribbons spirally wound together, one ribbon being transversely corrugated to form a plurality of cellular openings between adjacent convolutions of said ribbons, said cellular openings being approximately 1/8" in depth, and there being approximately 130 of said openings in each square inch of said mantle.

10. A heater comprising a plurality of spaced apart concentrically arranged closed wall surfaces having open ends and disposed vertically; a burner disposed centrally with respect to the inner wall surface; a mantle disposed in said inner wall surface and above said burner, the inner wall surface defining a combustion chamber and the outer wall surface an annular cooling chamber; and means disposed in said annular cooling chamber for conducting heat from said combustion chamber to said cooling chamber to thereby promote convection currents in said cooling chamber.

11. A heater comprising a plurality of spaced apart concentrically arranged closed wall surfaces having open ends and disposed vertically; a burner disposed centrally with respect to the inner wall surface; a mantle disposed in said inner wall surface and above said burner, the inner wall surface defining a combustion chamber and the outer wall surface an annular cooling chamber; and a grid spanning the cooling chamber for conducting heat from said combustion chamber to said cooling chamber to thereby promote convection currents in said cooling chamber.

12. A mantle for use in a radiant type heater which comprises a plurality of thin metallic ribbons spirally wound together, one of said ribbons being transversely corrugated to form a plurality of cellular openings between adjacent convolutions of said ribbons, there being between 100 and 200 of said openings in each square inch of said mantle.

13. A mantle for use in a radiant type heater which comprises a plurality of thin metallic ribbons spirally wound together, one of said ribbons being transversely corrugated to form a plurality of cellular openings between adjacent convolutions of said ribbons, the ratio of the depth of said cells to their average width being not greater than 2 to 1.

14. A mantle for use in a radiant type heater which comprises a plurality of thin one-eighth inch wide metallic ribbons spirally wound together, one of said ribbons being transversely corrugated to form a plurality of cellular openings between adjacent convolutions of said ribbons, there being approximately 130 of said openings in each square inch of said mantle.

HUGH G. LANDIS.